United States Patent Office 3,305,512
Patented Feb. 21, 1967

3,305,512
PRESSURE-SPRAYABLE WATER-SOLUBLE ALKYL
ACRYLATE POLYMER SOLUTIONS
Robert J. Gander, Whitehouse, N.J., assignor to Johnson
& Johnson, a corporation of New Jersey
No Drawing. Filed Apr. 9, 1964, Ser. No. 358,643
9 Claims. (Cl. 260—33.2)

The present invention relates to water-soluble film-forming compositions and more particularly to pressure-sprayable solutions of water-soluble film-forming polymers in which the propellent is the sole solvent for the film-forming polymer.

Because of the convenience of application, it is becoming increasingly popular to apply film-forming compositions from pressurized containers in the form of a fine mist or spray. The pressure is obtained by including in the container a highly volatile liquid that is a gas at ordinary room temperatures and pressures. Because of the insolubility of most film-formers in such volatile propellent liquids, it has been the practice to first prepare a solution of the film-forming polymer in a conventional solvent, such for example as acetone, ethyl acetate, or ethanol and then to charge the container with this solution and the propellent liquids to be used.

These solvents, however, are generally not readily released by the film-forming polymer and tend to evaporate relatively slowly. Propellents, on the other hand, although present as liquids in the pressurized container are gases at normal room temperature and accordingly evaporate rapidly. I have discovered that polymers of alkyl acrylates, both homopolymers and copolymers with other monomers, are generally soluble in certain propellents, hereinafter called solvent propellents, where the alkyl group is not too small; i.e., where it contains at least four carbon atoms and where the alkyl acrylate is present in amounts of at least 50% by weight of the polymer. However, all solutions of such acrylate and methacrylate polymers will not give satisfactory sprayable film-forming compositions. Also films formed from such polymers are insoluble in water and, accordingly, where applied to a patient, must either be peeled off or permitted to wear off or must otherwise be removed by the use of organic solvents.

It is an object of the present invention to prepare pressure-sprayable film-forming compositions wherein the sole solvent for the film-forming polymer is the propellent and in which the film-forming polymer is water-soluble. It is a further object to prepare pressure-sprayable solutions of water-soluble alkyl acrylate polymers wherein the only solvent for the polymer is one of the propellent liquids used and which when released from pressure through a dispensing valve in accordance with conventional aerosol technique will be dispensed in the form of a fine spray or droplets. Other objects and advantages of this invention will become apparent from the following description wherein are set forth by way of illustration and example certain embodiments of the same.

Although the alkyl acrylate polymers are found to be generally soluble in propellent solvents where the alkyl group contains at least four carbon atoms and the alkyl acrylate is present in amounts of at least 50% by weight of the polymer, these polymers are insoluble in water making it necessary to use organic solvents to remove the same after application. It is, as previously indicated, for many uses highly desirable to have such films water-removable so that the same, after being formed, can be readily removed by washing with water. These polymers can be made water-removable by including in the acrylate polymer amine sulfates having the group designated by the general formula

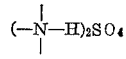

incorporated into the polymer through reaction with dimethylaminoethyl methacrylate hydrosulfate or the free amine which is later converted to the hydrosulfate. The active amine group

which forms the sulfate, should generally be present in amounts of at least 1.0% by weight of the total acrylate polymer in order to obtain water-removability of any acrylate polymer film formed. Where the active group

is present in amounts of much less than 1.0% by weight of the acrylate polymer the desirable characteristic of water-removability will not be present after the hydrosulfate is formed. The sulfate anion, however, appears to be a relatively active insolubilizing agent insofar as effecting the solubility of the acrylate polymer in propellent solvent is concerned. With increasing amounts above 2.0% by weight of

in the acrylate polymer the polymer hydrosulfate becomes increasingly insoluble in the propellent. Accordingly, in practicing the present invention the amine group

should be present in amounts within the range of about 1.0 to 2.0 based on the weight of the polymer.

The solubilizing amine hydrosulfates are incorporated into the polymer by using preferably, as one of the reactive monomers, dimethylaminoethyl methacrylate. The monomer used may be the amine hydrosulfate. However, in the preferred practice of the invention, the amine hydrosulfates are not formed until after polymerization has been completed after which the acrylate polymer containing the amine groups is converted to the amine hydrosulfate by neutralization with sulfuric acid.

It is apparently the presence of the amine hydrosulfate which causes the water solubilizing of the acrylate polymer to the point where films of the same can be removed from the skin by washing. It is also the presence of the dimethylaminoethyl hydrosulfate, when present in too large amounts, which inhibits the dissolving of the polymer in the propellent solvent. Acrylate copolymers containing amine groups are found to be just as insoluble in water as acrylate copolymers which do not contain the amine groups and the presence of the amine group does not appear to deleteriously affect the solubility in propellent solvents. However, after the hydrosulfate is formed by incorporating the sulfate ion into the amine group, the acrylate copolymers are solubilized to the extent that they can be readily removed from the skin by washing with water. However, solubility in the propellent solvent now no longer occurs if the concentration of the amine group

forming the hydrosulfate is above 2.0%. This water solubilizing effect, however, apparently only occurs where the solubilizing group

forming the salt is present in at least the minimum amounts previously indicated. Thus, for example, where the amine acrylate is dimethylaminoethyl methacrylate hydrosulfate, the same should be present in amounts of not substantially less than 17% of the copolymer by weight in order to obtain the solubilizing effect which makes the film-forming acrylate polymer water-removable. (17% dimethylaminoethyl methacrylate hydrosulfate is equivalent to 1.2% of

group.) However, if the concentration of the dimethylaminoethyl methacrylate hydrosulfate is increased to 30% by weight of the polymer, the polymer is no longer sufficiently soluble in propellent solvents, such for example as Freon 11, to completely dissolve in the same (30% dimethylaminoethyl methacrylate hydrosulfate is equivalent to 2.2% of the

group). This is well illustrated by the following table:

ACRYLATE POLYMERS CONTAINING AMINE HYDROSULFATE GROUPS

| Polymer Composition, Weight Percent [1] | | | Rel. Vis. of Free Base [2] | Neut. Equiv. of Free Base [3] | Water Solubility [4] | Fluorocarbon Solubility [5] |
| --- | --- | --- | --- | --- | --- | --- |
| EHA | BACA | DMAEMA | | | | |
| 75 | 10 | 15 | 1.31 | 1,042 | Insoluble | Soluble. |
| 70 | 10 | 20 | 1.30 | 786 | Soluble | Do. |
| 65 | 10 | 25 | 1.29 | 627 | do | Do. |
| 60 | 10 | 30 | 1.28 | 513 | do | Insoluble. |
| 50 | 10 | 40 | 1.30 | 379 | do | Do. |

[1] EHA=2-ethylhexyl acrylate; BACA=N-tert.-butylacrylamide; DMAEMA=Dimethylaminoethyl methylacrylate.
[2] At a concentration of 1.000 g./100 ml. in toluene at 30° C.
[3] By potentiometric titration in 50-50 benzene-ethanol using 0.1 N ethanolic hydrochloric acid.
[4] At a concentration of 0.2 percent in water.
[5] At a concentration of 5.0 percent in 50-50 Propellants 11 and 12.

Although alkyl acrylate polymers and copolymers of the type herein described are found to be soluble in propellent solvents a pressure-sprayable solution is not necessarily obtained. Sprayable compositions or solutions are only obtained if the free base polymer used has a relative viscosity prior to conversion to the salt of not appreciably over 1.60 and is present in solution in the propellent solvent in a concentration of not appreciably over 6.0 weight percent. As a viscosity of at least about 1.1 is needed in order to form a non-liquid film, the viscosity should preferably be within the range of about 1.20 to 1.60. Free base polymer refers to the amine-containing polymer before conversion to the amine salt. Where the relative viscosity of the polymer is appreciably greater than about 1.6, or where the concentration in the propellent solvent is appreciably above 6.0%, a wet jetlike stream is obtained rather than a spray. Relative viscosities are measured at 30° C. on toluene solutions of the polymer at a concentration of 1.000 gram per 100 ml.

The alkyl acrylate polymer films are applied by dispensing the same under pressure from a pressurized container wherein the polymer is present in the form of a solution in one of the propellents used. The propellent pressure in the container is preferably in the range of about 20 to 60 pounds per square inch gauge at a temperature of 75° F. Where the solvent propellent used will not by itself give a sufficiently high total pressure, other propellents are employed together with the solvent propellent to give the pressure desired.

PROPELLENTS

As previously indicated, in practicing the present invention the film-forming polymer is not dissolved in the usual resin solvents but is dissolved in a propellent solvent. The term propellent, as herein used, is used in the conventional sense. A propellent is, for example, defined in "Aerosols: Science and Technology," Interscience Publishers, Inc., New York, New York, page 214, as "A liquefied gas with a vapor pressure greater than atmospheric pressure (14.7 p.s.i.a.) at a temperature of 105° F." This definition is sufficiently broad to include some liquids which, used alone, would not function as propellents, but in solution with selected liquefied gases make satisfactory pressurized systems. An example is methylene chloride whose boiling point is 105° F., at which temperature its vapor pressure equals atmospheric pressure. Thus it just falls within the limits of the definition. At ordinary room temperature, methylene chloride has a vapor pressure below atmospheric pressure and cannot function as a propellent but, when dissolved in a liquid of high vapor pressure, it will give resultant pressures satisfactory for application to an aerosol system.

Propellent solvents are those propellents which are also solvents for the alkyl acrylate film-forming polymers used.

Propellent solvents generally available are trichlorofluoromethane ($CCl_3F$), generally referred to in the trade as Propellent 11; dichlorofluoromethane ($CHCl_2F$), generally referred to in the trade as Propellent 21; vinyl chloride ($CH_2=CHCl$); and dimethyl ether ($CH_3OCH_3$).

Of these propellent solvents, the one preferred and the one found to give the best results with the widest range of alkyl acrylate film-forming polymers is Propellent 11. Propellent 11 is a good solvent for the film-forming polymers and is readily released by the polymers after being dispensed from the pressurized container. Where Propellent 11 is used as the propellent solvent, it is used together with another propellent, such as Propellent 12, dichlorodifluoromethane, in order to increase the pressure in the container to the desired 20 to 60 pounds per square inch gauge at 75° F.

With respect to the other propellent solvents referred to, Propellent 21 is a good solvent for film-forming resins suitable for use in the present invention. This particular propellent solvent, however, has the characteristic that it is retained somewhat more tenaciously by the alkyl acrylate polymers than is Propellent 11 even though it boils at a substantially lower temperature than Propellent 11. This is apparently due to the strong associative hydrogen bonding between Propellent 21 and the resin molecules. Accordingly, for the more rapid drying Propellent 11 is preferred.

The vinyl chloride propellent is a good solvent for the alkyl acrylate and alkyl methacrylate polymers. However, the vinyl chloride propellent has the characteristic of being retained more tenaciously by the dissolved polymer, after the same has been sprayed into a film in much the same manner as is Propellent 21. It, accordingly, gives a much slower drying rate for the polymer film despite the fact that the vinyl chloride boils, at +7.9° F. As the vinyl chloride has a gauge pressure of 34 pounds per square inch at 70° F., it can be used alone without a further propellent. However, the flammable nature of the vinyl choride together with its tendency to be retained by the alkyl acrylate and alkyl methacrylate polymers makes it generally unsuitable for use alone as the propellent solvent in the preferred formulations of the present invention.

Dimethyl ether is another fairly good propellant solvent which is a relatively good solvent for the alkyl acrylate and alkyl methacrylate polymers. The dimethyl ether has a boiling points of −12.7° F. and a gauge pressure at 70° F. of 60 pounds per square inch. However, the dimethyl ether is flammable and has an ethereal odor, both of which properties make it generally unsuitable for surgical purposes when used alone particularly where sparks or open flame may be encountered.

As is clear from the above, the preferred propellent solvent is Propellent 11. The other propellent solvents can, however, be used particularly where used in blends with Propellent 11. They may also, in some instances, be used without any Propellent 11 being present. However, Propellent 11 is preferred, either as the sole propellent solvent or as the major propellent solvent where blended with any of the other propellent solvents mentioned. The blending of Propellent 11 with vinyl chloride best illustrates some of the advantages obtained by using at least some Propellent 11. Vinyl chloride has been indicated as being flammable and, accordingly, generally undesirable in the preferred compositions. However, the vinyl chloride can be used in minor amounts in blends with Propellent 11 and non-solvent Propellent 12 to give satisfactory nonflammable propellent compositions. For example, the following formulations are nonflammable and give the indicated pressure at 70° F.

| Weight Percent | | | Pressure at 70° F. p.s.i.g. |
| --- | --- | --- | --- |
| Prop. 11 | Prop. 12 | ViCl | |
| 43 | 37 | 20 | 39 |
| 39 | 39 | 22 | 36.5 |
| 45 | 20 | 35 | 34 |
| --------- | 65 | 35 | 61 |
| --------- | 80 | 20 | 66 |

Although various propellent blends can be used as long as they contain a solvent propellent and give a pressure of about 20 to 60 pounds per square inch gauge in the pressurized container at a temperature of 75° F., the propellent formulation preferred is 40 to 70 weight percent solvent Propellent 11 and 60 to 30 weight percent non-solvent Propellent 12. In further describing the invention propellent mixtures consisting of 50 weight percent solvent Propellent 11 and 50 weight percent non-solvent Propellent 12 will be used.

PROPELLENT SOLUTION OF
FILM-FORMING POLYMER

As previously indicated, I have discovered that alkyl acrylate polymers are generally soluble in the propellent solvents, heretofore discussed, where the alkyl group contains at least 4 carbon atoms, the larger the alkyl group apparently the more readily soluble the polymer. The homopolymers of the alkyl acrylates are readily soluble as are generally the copolymers of these monomers with other monomers particularly where the alkyl acrylate is present in the copolymer in amounts of at least 50 percent by weight of the polymer.

The film to be formed may either be a permanently tacky film of the pressure-sensitive adhesive type or a dry protective film covering. This is controlled by the particular polymer or copolymer used. However, satisfactory propellent solutions of the polymer cannot be obtained unless the polymer has a relative viscosity of not appreciably over 1.60 and is present in the propellent solvent in a concentration of not appreciably over 6.0 weight percent.

Among the preferred polymers for practicing the present invention are terpolymers of an alkyl acrylate, N-tert.-butylacrylamide and dimethylaminoethyl methacrylate hydrosulfate.

Either 2-ethylhexyl acrylate or n-butyl acrylate give excellent film-forming resins when polymerized with N-tert.-butylacrylamide and the amine-containing methacrylate, subsequently converting the polymer to the amine hydrosulfate salt. The lower alkyl acrylates, such as methyl and ethyl, when used in these systems are generally unsatisfactory for the purposes of the present invention, as the polymers obtained are not sufficiently soluble in the propellent solvent.

The effect of concentration of polymer in the propellent solvent is well illustrated by the following table. This table shows the spray characteristics of hydrosulfate salts of two terpolymers. One of the terpolymers contains 70 percent 2-ethylhexyl acrylate, 10 percent N-tert.-butylacrylamide and 20 percent dimethylaminoethyl methacrylate. The other contains 65 percent 2-ethylhexyl acrylate, 10 percent N-tert.-butylacrylamide and 25 percent dimethylaminoethyl methacrylate. Spray characteristics for both polymeric salts are the same. The terpolymers are dissolved in a propellent solvent consisting of 50 percent trichlorofluoromethane and 50 percent dichlorodifluoromethane. The ingredients are placed in 6-ounce pressure cans which are closed with conventional aerosol spray nozzles.

| Hydrosulfates of terpolymers, wt. percent: | Spray character |
| --- | --- |
| 3.0 | Fine spray. |
| 5.0 | Fine spray. |
| 7.0 | Fine spray, but polymer precipitates and collects on the valve orifice. |
| 9.0 | Coarse wet spray with heavy precipitation of polymer on the valve orifice. |

The following examples, given for the purpose of illustration only, will help to further illustrate the practice of the present invention:

*Example I*

A 5-liter, 3-neck flask is provided with a reflux condenser, a mechanical stirrer, a nitrogen inlet tube, and a thermometer. The flask is charged with 525 grams of 2-ethylhexyl acrylate, 150 grams of dimethylaminoethyl methacrylate, 75 grams of N-tert.-butylacrylamide and 750 grams of ethyl acetate. The dimethylaminoethyl methacrylate amounts to 20 percent of the monomer charge. During a 30-minute period the reaction mixture is heated to 75–80° C. and stirred while a slow stream of nitrogen is swept through the apparatus. The N-tert.-butylacrylamide dissolves during this heating period. Nitrogen flow is then discontinued and 1.90 grams of 2,2′-azobisisobutyronitrile are added. After an induction period of a few minutes, an exothermic polymerization takes place, causing the ethyl acetate to reflux vigorously. This soon subsides, and the thickened reaction mixture is stirred and heated at 80–85° C. for 3.5 hours. The reaction is then discontinued and the solution cooled to room temperature. The solids content of a sample heated for 5 hours at 105° C. is 50.5 percent.

The ethyl acetate is dried from the polymer by casting the solution in a thin film on silicone-coated paper, then drying at 160° F. The polymer is very tacky and has a relative viscosity of 1.31 (1.000 g./100 ml. toluene solution at 30° C.). The neutral equivalent of the polymer is 780, measured by titrating samples potentiometrically with 0.1 N ethanolic hydrochloric acid in a solution of 50 percent benzene and 50 percent ethanol.

The hydrosulfate salt of the polymer is prepared by neutralizing 100 grams of the reaction mixture with 34.0 ml. of 1.90 N ethanolic sulfuric acid. The salt is dried on silicone-coated paper. It is a slightly tacky material which dissolves in water at a concentration of 0.2 gram per 100 ml. to give a turbid solution. It dissolves at a concentration of 5 percent in a blend of 50 percent trichlorofluoromethane and 50 percent dichlorodifluoromethane, forming a colorless solution.

*Example II*

The polymerization procedure of Example I is repeated using a monomer charge of 487.5 grams of 2-ethylhexyl acrylate, 75.0 grams of N-tert.-butylacrylamide, and 187.5 grams of dimethylaminoethyl methacrylate. The dimethylaminoethyl methacrylate amounts to 25 percent of the monomer charge. After polymerization, the reaction mixture has a solids content of 50.6 percent. The polymer has a relative viscosity of 1.29 and a neutral equivalent of 627.

The hydrosulfate salt is prepared as in Example I, using an appropriate amount of standard sulfuric acid based on the neutral equivalent of 627.

The hydrosulfate salt is soluble in water (0.2 gram per 100 ml.) and in a blend of 50 percent trichlorofluoromethane and 50 percent dichlorodifluoromethane.

*Example III*

Solutions of the hydrosulfate salts of Examples I and II are made in each of the four propellent systems shown in the following table. The polymer concentration is three weight percent in each case. The solutions are prepared in aerosol cans and closed with spray valves.

No.: Propellant solvent
1 _____ 50% trichlorofluoromethane-50% dichlorodifluoromethane.
2 _____ 90% vinyl chloride-10% trichlorofluoromethane.
3 _____ 60% dichlorofluoromethane-40% dichlorodifluoromethane.
4 _____ 100% dimethyl ether.

When discharged through the aerosol valve, each of the solutions produces a finely atomized spray of excellent appearance. When applied to the skin, the propellent solvent evaporates rapidly leaving a thin film of the polymer. The polymer film is readily removed by washing with water.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. In a pressurized system for spray application a solution of a film-forming polymer in propellent the solvent for said polymer in said system consisting essentially of a propellent used in said system the propellent of said system including at least one propellent solvent of the group consisting of trichlorofluoromethane, difluorochloromethane, vinyl chloride and dimethyl ether, said film-forming polymer being a polymer of an alkyl acrylate and dimethylaminoethyl methacrylate said alkyl acrylate having an alkyl group of at least four carbons and being present in said polymer in an amount of at least 50 percent by weight, said polymer in the free base polymer form having an intrinsic viscosity of not over 1.6 and present in said solution in a concentration of not over 6.0 percent by weight, said polymer containing about 1.0 to 2.0 percent by weight of the radical

where the radical is present in the salt form

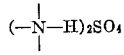

2. A pressurized system of claim 1 in which the major portion of propellent solvent is trichlorofluoromethane.

3. In a pressurized system for spray application a solution of a film-forming polymer in propellent the solvent for said polymer in said system consisting essentially of a propellent used in said system the propellent of said system including at least one propellent solvent of the group consisting of trichlorofluoromethane, difluorochloromethane, vinyl chloride and dimethyl ether, said film-forming polymer being a polymer of an alkyl acrylate polymerized with dimethylaminoethyl methacrylate, said alkyl acrylate being at least one of the group consisting of 2-ethylhexyl acrylate and n-butyl acrylate and being present in said polymer in an amount of at least 50 percent by weight, said polymer in the free base polymer form having an intrinsic viscosity of not over 1.6 and present in said solution in a concentration of not over 6.0 percent by weight, said polymer containing about 1.0 to 2.0 percent by weight of the radical

where the radical is present in the salt form

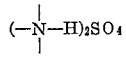

4. In a pressurized system for spray application a solution of a film-forming polymer in propellent the solvent for said polymer in said system consisting essentially of a propellent used in said system the propellent of said system including at least one propellent solvent of the group consisting of trichlorofluoromethane, difluorochloromethane, vinyl chloride and dimethyl ether, said film-forming polymer being a terpolymer of an alkyl acrylate, N-tert.-butylacrylamide and dimethylaminoethyl methacrylate said alkyl acrylate having an alkyl group of at least four carbons and being present in said polymer in an amount of at least 50 percent by weight, said polymer in the free base polymer form having an intrinsic viscosity of not over 1.6 and present in said solution in a concentration of not over 6.0 percent by weight, said polymer containing about 1.0 to 2.0 percent by weight of the radical

where the radical is present in the salt form

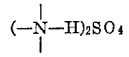

5. A pressurized system of claim 4 in which said alkyl acrylate is at least one of the group consisting of 2-ethylhexyl acrylate and n-butyl acrylate.

6. In a pressurized system for spray application a solution of a film-forming polymer in propellent, said propellent consisting essentially of 75 to 25 parts by weight of trichlorofluoromethane and 25 to 75 parts by weight of dichlorodifluoromethane, said film-forming polymer being a terpolymer of an alkyl acrylate, N-tert.-butylacrylamide and dimethylaminoethyl methacrylate, said alkyl acrylate having an alkyl group of at least four carbons and being present in said polymer in an amount of at least 50 percent by weight, said polymer in the free base polymer form having an intrinsic viscosity of not over 1.6 and present in said solution in a concentration of not over 6.0 percent by weight, said polymer containing about 1.0 to 2.0 percent by weight of the radical

where the radical is present in the salt form

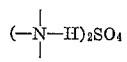

said solution containing no solvent for said film-forming polymer other than said propellents.

7. A pressurized system of claim 6 in which said alkyl acrylate is at least one of the group consisting of 2-ethylhexyl acrylate and n-butyl acrylate.

8. A pressurized system of claim 7 in which the alkyl acrylate is 2-ethylhexyl acrylate.

9. A pressurized system of claim 7 in which the alkyl acrylate is n-butyl acrylate.

References Cited by the Examiner
UNITED STATES PATENTS

| | | | |
|---|---|---|---|
| 2,617,780 | 11/1952 | Lutz | 260—33.8 |
| 2,897,172 | 7/1959 | Maeder | 260—33.8 |
| 3,062,751 | 11/1962 | Wahlin | 167—82 |

MORRIS LIEBMAN, *Primary Examiner.*

L. T. JACOBS, *Assistant Examiner.*